(12) United States Patent
Kamalapuram et al.

(10) Patent No.: US 11,294,865 B2
(45) Date of Patent: Apr. 5, 2022

(54) USING A SCAN DATA LEDGER FOR DISTRIBUTED SECURITY ANALYSIS OF SHARED CONTENT

(71) Applicant: Citrix Systems, Inc., Fort Lauderdale, FL (US)

(72) Inventors: Ramanjaneya Reddy Kamalapuram, Bangalore (IN); Praveen Raja Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 557 days.

(21) Appl. No.: 16/101,841

(22) Filed: Aug. 13, 2018

(65) Prior Publication Data

US 2020/0050686 A1 Feb. 13, 2020

(51) Int. Cl.
| | |
|---|---|
| G06F 16/176 | (2019.01) |
| G06F 21/44 | (2013.01) |
| H04L 29/08 | (2006.01) |
| G06F 16/11 | (2019.01) |
| H04L 9/06 | (2006.01) |
| G06F 16/182 | (2019.01) |
| G06F 21/62 | (2013.01) |

(52) U.S. Cl.
CPC ......... *G06F 16/176* (2019.01); *G06F 16/122* (2019.01); *G06F 16/182* (2019.01); *G06F 21/44* (2013.01); *G06F 21/6218* (2013.01); *H04L 9/0637* (2013.01); *H04L 67/1097* (2013.01); *G06F 2221/2141* (2013.01); *H04L 2209/38* (2013.01)

(58) Field of Classification Search
CPC .... G06F 16/176; G06F 16/182; G06F 16/122; G06F 21/44; G06F 21/6218

USPC .......................................................... 707/783
See application file for complete search history.

(56) References Cited

U.S. PATENT DOCUMENTS

| | | | |
|---|---|---|---|
| 7,797,748 B2 | 9/2010 | Zheng et al. | |
| 8,752,176 B2 | 6/2014 | Mahaffey et al. | |
| 9,855,785 B1* | 1/2018 | Nagelberg | G06K 7/10722 |
| 2011/0276490 A1 | 11/2011 | Wang et al. | |
| 2016/0188878 A1 | 6/2016 | Kulkarni et al. | |
| 2016/0226841 A1* | 8/2016 | Linnakangas | H04L 63/06 |
| 2017/0041296 A1* | 2/2017 | Ford | G06F 16/951 |
| 2017/0279818 A1 | 9/2017 | Milazzo et al. | |
| 2018/0088928 A1* | 3/2018 | Smith | H04L 9/3239 |

(Continued)

OTHER PUBLICATIONS

Oct. 8, 2019—(WO) International Search Report and Written Opinion—App PCT/US2019/043642.

*Primary Examiner* — Alicia M Antoine
(74) *Attorney, Agent, or Firm* — Banner & Witcoff, Ltd.

(57) ABSTRACT

Methods and systems for providing a cost effective and robust security solution for shared files stored by file sharing software solutions are described herein. The methods and systems for generating a ledger associated with shared files, which may include scanning data received from applications associated with a number of client devices and from a cloud based scanner. An access manager may control file permissions granted to users based on requests for scan data from each user device requesting access to a shared file. A plurality of different scanning applications may provide data that is collected for each shared file to provide a diverse analysis of a shared file to increase user confidence in a file security status.

19 Claims, 8 Drawing Sheets

(56) References Cited

U.S. PATENT DOCUMENTS

2019/0332770 A1* 10/2019 Kumar ................. G06F 16/137
2019/0373137 A1* 12/2019 Krukar ................. G06F 3/1222
2020/0036533 A1* 1/2020 Soundararajan ...... H04W 12/61

* cited by examiner

USING A SCAN DATA LEDGER FOR DISTRIBUTED SECURITY ANALYSIS OF SHARED CONTENT

FIELD

Aspects described herein generally relate to computers, networking, hardware, and software, cryptography, and security measures in place therein. More specifically, one or more aspects of the disclosure relate to cloud file management services, and in particular, relate to distributed security analysis for shared file content uploaded into a cloud file management system.

BACKGROUND

As computers have become ubiquitously interconnected, the race between attackers and security experts has intensified. A variety of different security tools are available from various companies. As new attacks are developed, security experts try to create and update their analyzers to address the latest vulnerability footprints. These updates may include patches that need to be downloaded and/or installed by different host systems.

It is common for cloud services, which may aid file sharing services across a cloud network, to perform security analysis of files stored in the cloud to ensure safety of the enterprise. Security analyzers and/or scanners may also be implemented in various enterprise hosts based on a company policy.

As security policies are enforced at different stages in an enterprise, different systems accessing the same file will have different types and levels of security analysis applied. Each of those security tools may recognize only a certain portion or subset of issues. Further, for each of the different security tools or applications, as implemented on a distributed network of hosts, different updates or patches may or may not have been applied. As such, each of the security tools may not be updated to address the latest vulnerabilities. For example, a first company might capture the footprint of a first new security issue earlier than a second company, while the second company may capture the footprint of a second new security issue earlier than the first company. In addition, a first user of the product of the first company may have applied all of the updates from the first company, while a second user of the product of the first company may not have updated their product in several days or weeks. Thus, there is no assurance that each different security scanner has or can identify a particular threat.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present specification, aspects described herein are directed towards a method including storing, by a first user device, a shared file in a shared network storage system; receiving, by the network storage system and from the first user device, scan data associated with the shared file; generating, by the network storage system, a ledger associated with the shared file, wherein the ledger comprises the scan data associated with the shared file; receiving, at the network storage system, scan data from one or more additional user devices; determining, by the network storage system, that the shared file is a valid file to share with users of the network storage system based on the scan data from one or more of the first user device and the one or more additional user devices; updating, by the network storage system and in response to the receipt of scan data from the one or more additional user devices, the ledger of the shared file in the network storage system; and providing, by the network storage system and based on the determination, permission to access the shared file to the one or more additional user devices.

The methods may include sending, from the network storage system and to the one or more additional user devices, a request for a scanner credential from the one or more additional user devices; receiving, at the network storage system, the scanner credential from the one or more additional user devices; authenticating, by the network storage system, an additional user device scanner based on the scanner credential received from the one or more additional user devices; receiving, from one or more of the first user device and the one or more additional user devices, scan data; analyzing the scan data for an indicator that the shared file includes one or more of signatures of known exploits, malware, or viruses; and determining that shared file is valid based on the indicator of the scan data. The methods may include obtaining, by the network storage system, policy information associated with the shared file; preventing, based on the policy information associated with the shared file, write access to the shared file until policy conditions have been met; generating a blockchain associated with the shared file; adding to the blockchain based on scan data of the one or more additional user devices and a hash related to scan data of at least one of the first user device or the network storage system; scanning, by the network storage system, the shared file with a security application to generate the scan data; associating, by the network storage system, the scan data with the ledger of the shared file; weighting, by the network storage system, the scan data based on a type scanning; and determining, based on the weighted scan data, a relative confidence value of the shared file.

In some aspects, the network storage system may include a cloud network storage system, and the ledger may be stored in the same cloud network storage system as the shared file. In other aspects, providing permission to access the shared file to the one or more additional user devices may be based on the relative confidence value of the shared file, and the scan data may include scanner type data indicating a type of scanner and scanner update data indicating any updates the scanner has applied.

In addition, in some examples, aspects of the disclosure may include an apparatus or system that may include a network interface, at least one processor, and a tangible computer memory storing computer-executable instructions that, when executed by the at least one processor, cause the apparatus or system to perform one or more of the following: store a shared file in a network storage system; requesting, from a first device, scan data associated with the shared file; generate a ledger associated with the shared file, wherein the ledger comprises the scan data associated with the shared file; receive a request from a second user device to access the shared file stored on the network storage system; in response to receiving the request to access the shared file, request scan data from the second user device; update, based on a response to the request for scan data from the second user device, the ledger of the shared file in the network storage system; transmit, based on a positive result in the scan data from the second user device, write permission for the shared file to the second user device; receive, from a third user device, a second request to access the shared file stored on the network storage system; in response to receiving the second request to access the shared file, request scan data from the third user device; update, based on a response to the requesting scan data from the third user device, the ledger of the shared file in the network storage system; deny, based on a negative result in the scan data from the third user device, write permission for the shared file to the third user device; obtain policy information associated with the shared file; prevent, based on the policy information associated with the shared file, write access to the shared file until policy conditions have been met; scan of the shared file with a security application of a cloud storage system to generate the scan data; associate the scan data with the ledger of the shared file; weight the scan data based on a type scanning; and determine a relative confidence that the shared file is secure. In some aspects, the scan data may include scanner type data indicating a type of scanner and scanner update data indicating any updates the scanner has applied.

In additional examples, non-transitory computer-executable instructions, when executed by the computer processor, may cause the system to perform one or more of the following: store a shared file in a network storage system; requesting, from a first device, scan data associated with the shared file; generate a ledger associated with the shared file, wherein the ledger comprises the scan data associated with the shared file; receive a request from a second user device to access the shared file stored on the network storage system; in response to receiving the request to access the shared file, request scan data from the second user device; update, based on a response to the request for scan data from the second user device, the ledger of the shared file in the network storage system; transmit, based on a positive result in the scan data from the second user device, write permission for the shared file to the second user device; receive, at the network storage system and from a third user device, a second request to access the shared file stored on the network storage system; in response to receiving the second request to access the shared file, request scan data from the third user device; update, based on a response to the requesting scan data from the third user device, the ledger of the shared file in the network storage system; deny, based on a negative result in the scan data from the third user device, write permission for the shared file to the third user device; obtain policy information associated with the shared file; and prevent, based on the policy information associated with the shared file, write access to the shared file until policy conditions have been met. In some aspects, the scan data may include scanner type data indicating a type of scanner and scanner update data indicating any updates the scanner has applied.

In view of the foregoing, the different security measures employed by a plurality of systems accessing a shared file may be leveraged to save costs and/or provide a robust security system. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using applications at host devices and mobile applications at mobile computing devices. As different systems accessing the same file will have different types and levels of security analysis applied, each system may recognize only a certain portion or subset of potential issues. Further, different updates or patches may or may not have been applied to each instance of the different security tools or applications. As such, each of the security tools may not be updated to address the latest vulnerabilities.

By utilizing different scanning services of different devices and applications, a more robust analysis of file security and validity may be provided to each network device accessing a shared file. An access manager may perform a validation process that determines whether an application requesting access to a file stored in enterprise resources has provided scan data related to the file to be accessed. The scan data may include data to the accurately identify the particular scanner application and version of the scanner application performing the scan. The access manager may gather additional scan data from a plurality of hosts and mobile devices requesting access to the file stored on the enterprise resource and enhance robustness of the security mechanisms used to protect those enterprise resources. As a result, individuals associated with the enterprise may advantageously access files stored on enterprise resources with increased confidence.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
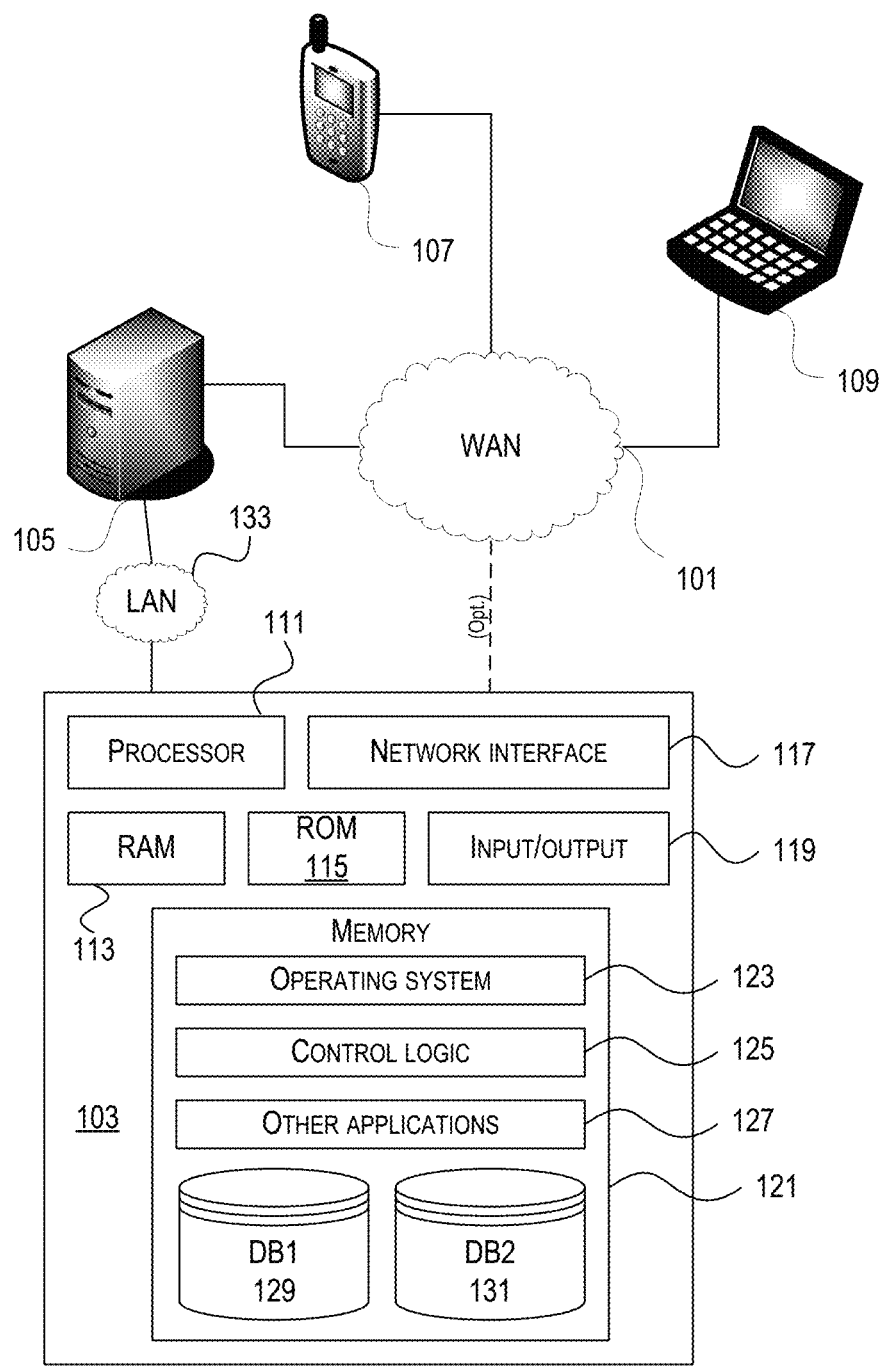
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines.

FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database (DB1) 129 and a second database (DB2) 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
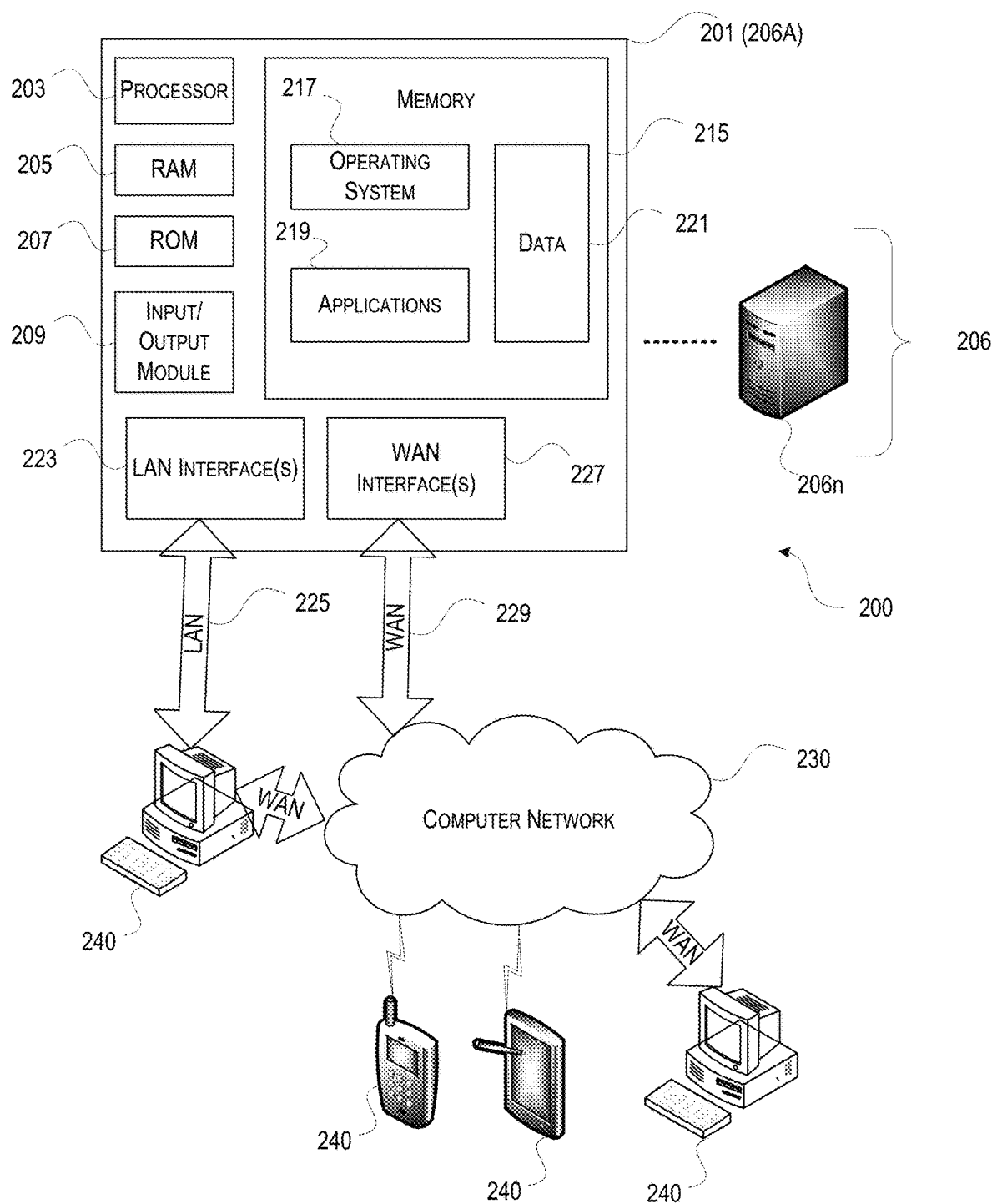
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221. Each instance of computing device 201 may include a different type or version of at least security application for scanning files as one of the application programs 219.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
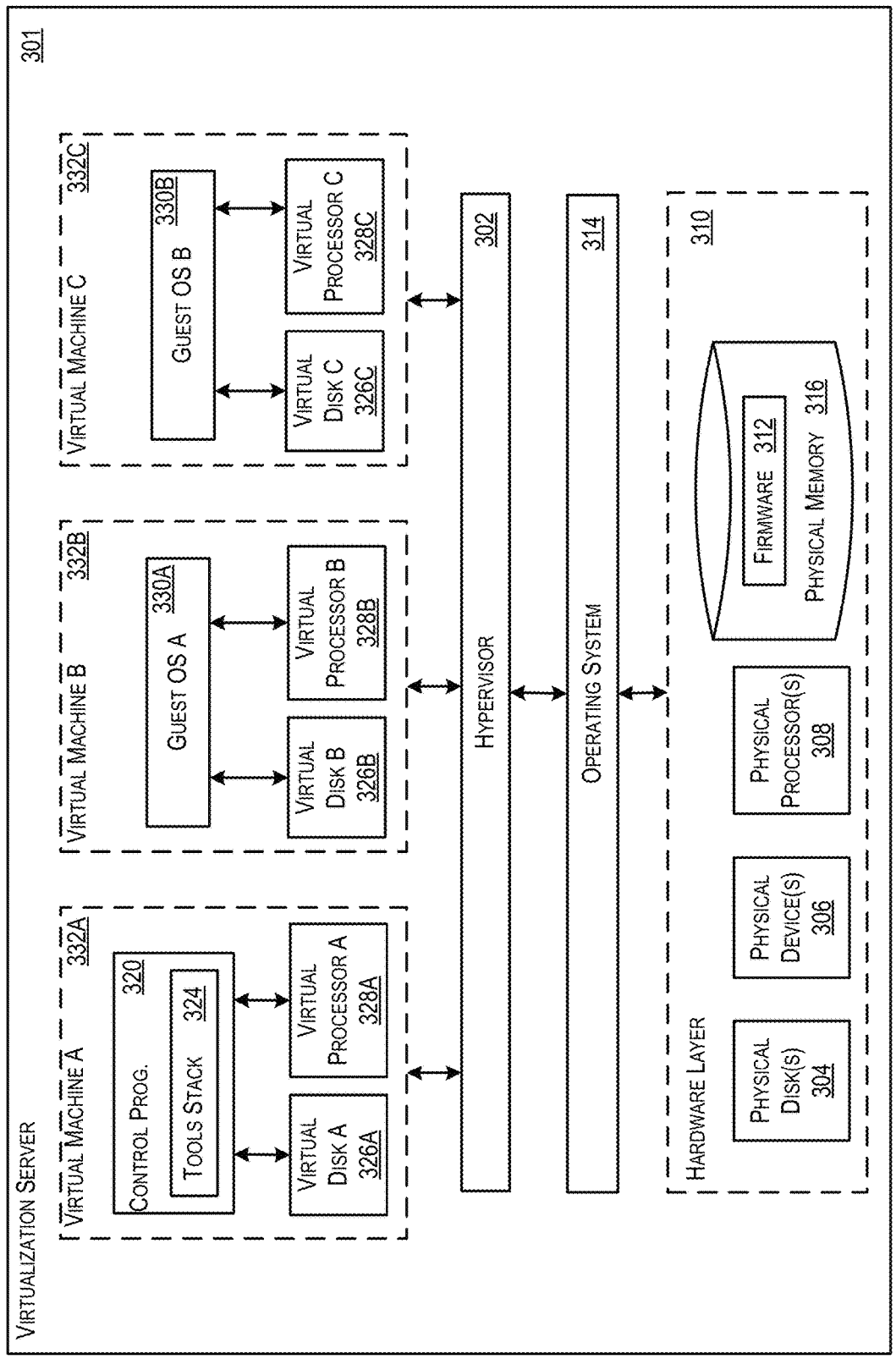
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions, including scanners, stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, each of the different virtual machines may have different preferences that result in different versions of each application being implemented on each virtual machine. In addition, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
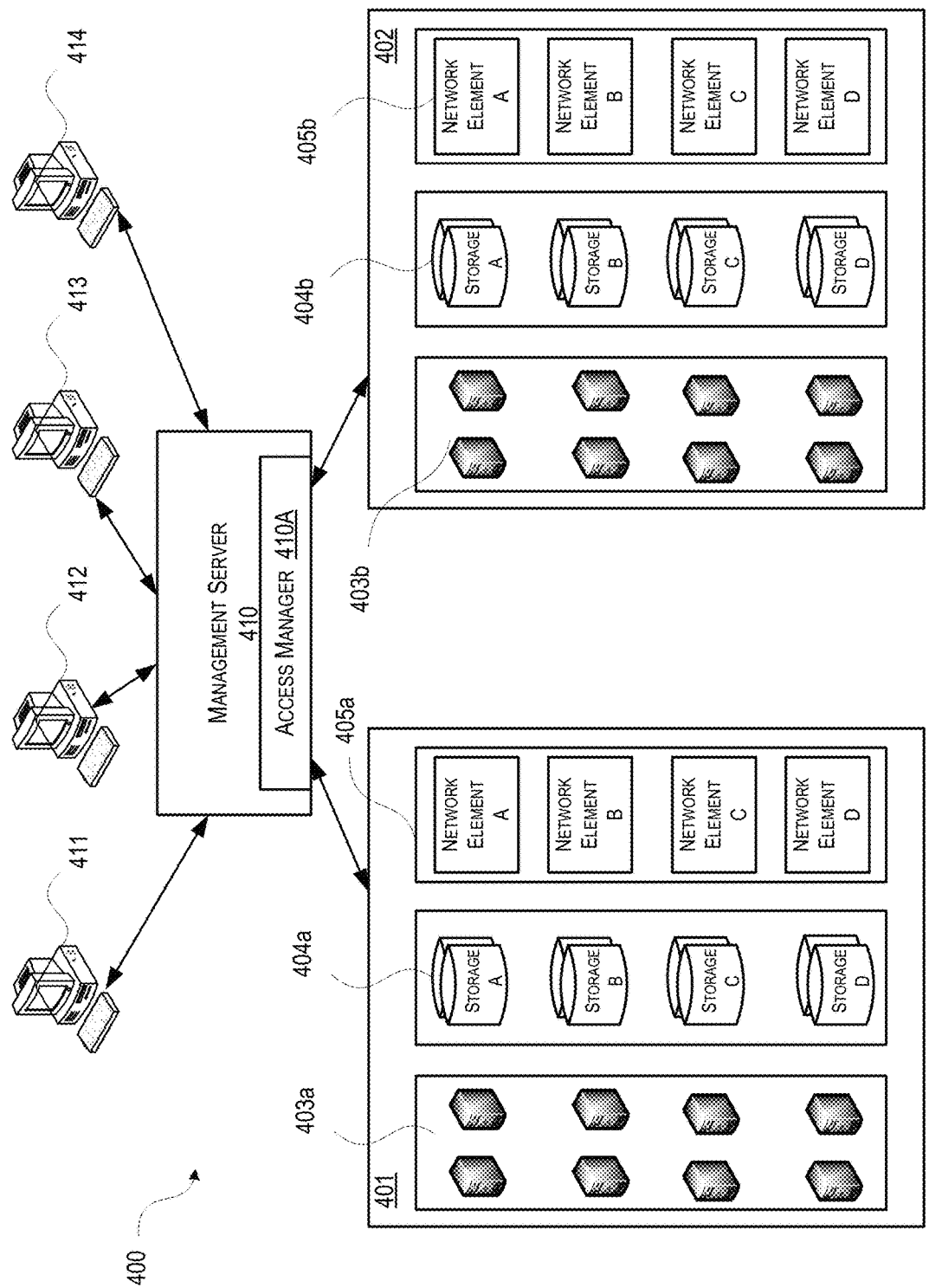
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. The set of APIs and/or one or more customer console applications with user interfaces may include cloud file management interfaces that provide file access management options from enterprise administrators.

The management server 410 also may include an access manager 410A with a set of APIs and/or one or more customer interface applications that communicate with user interfaces and applications. The access manager 410A may be configured to receive cloud storage requests from end users via client computers 411-414 including, for example, requests to create, modify, or destroy files within the cloud storage resources 404. The access manager 410A may also be deployed as a service within the host servers 403, cloud storage resources 404 or networking devices 405.

Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
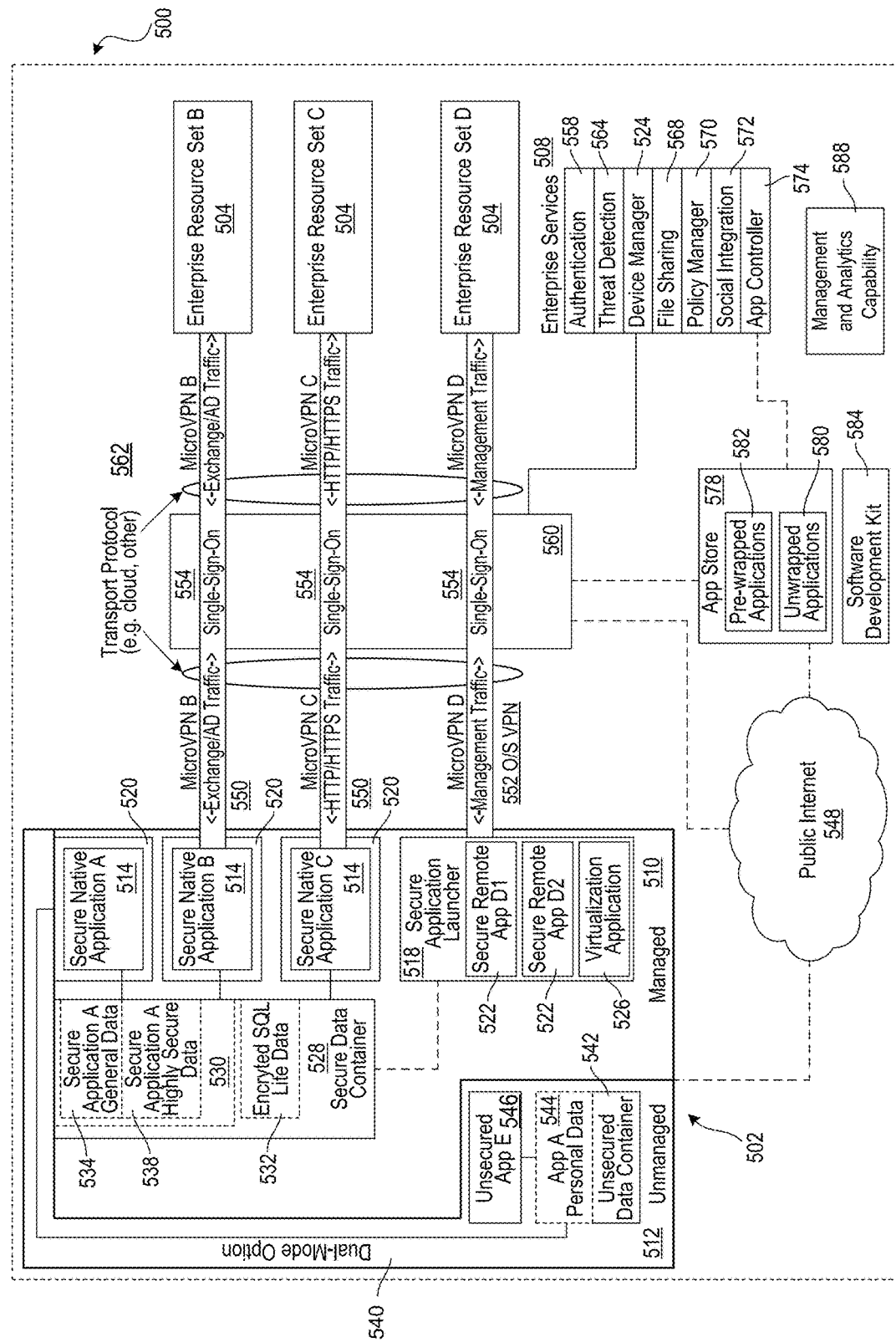
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device. The mobile device management policies may include file scanning requirements for specified applications.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, scanning requirements, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies, such as scanning requirements, that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data, file scan data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504. These authentication credentials may be used by each the multiple enterprise resources, including storing the authentication credentials with scan data associated with the user.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway 560 via a transport network. The transport network may use one or more transport protocols 562 and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include SHAREFILE servers, and the like. The file sharing servers may be protected by scanning software that scan each file saved to a space in the file sharing server. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like. Each of the authentication services 558, threat detection services 564, device manager services 524, file sharing services 568, policy manager services 570, social integration services 572, application controller services 574, and the like may be communicatively coupled with an access manager to provide file administrators or users additional information about attempts to access shared files. Attempts to access the shared files may be logged in a ledger along with scan data associated with the shared file.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
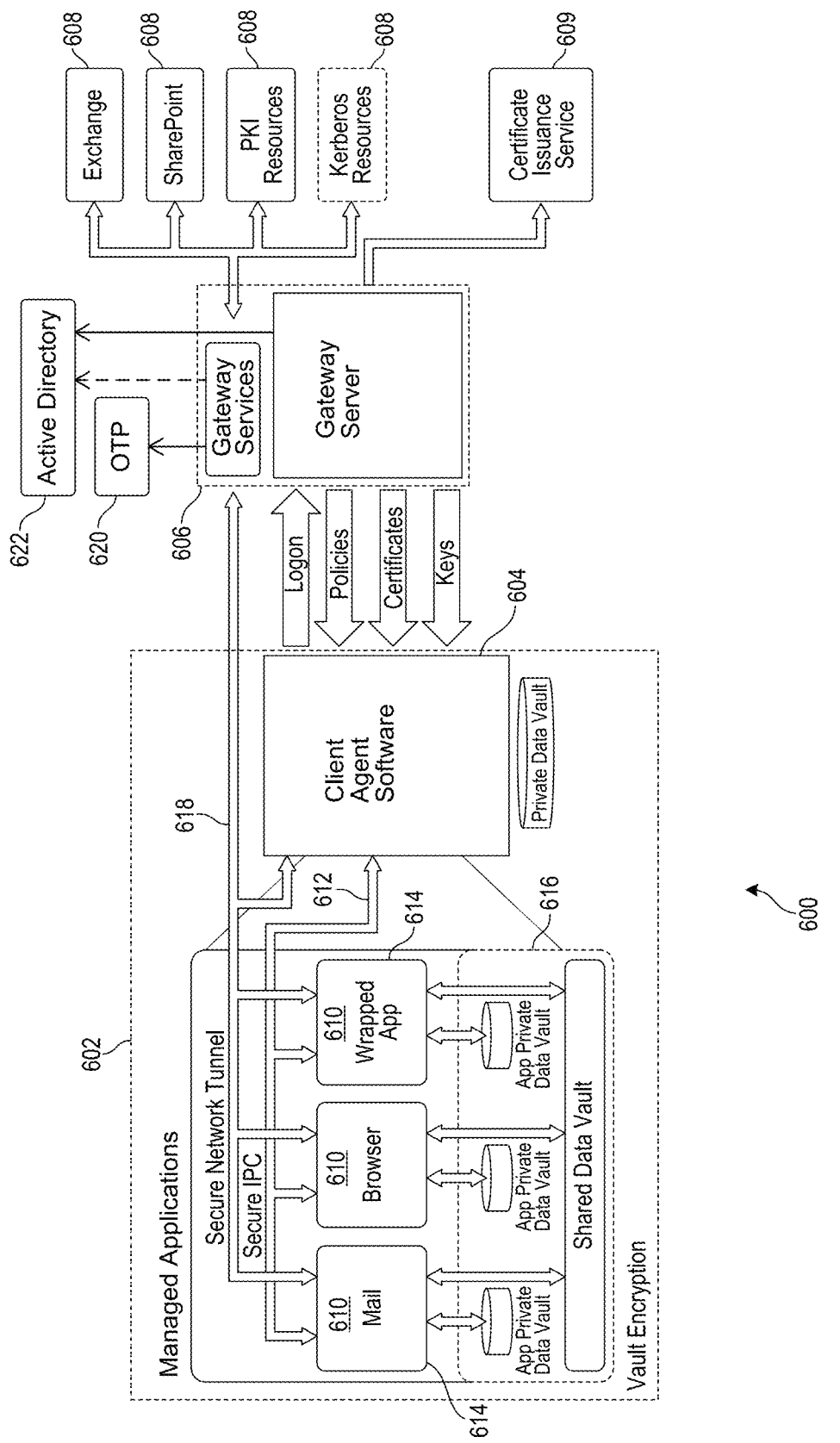
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application 610. The IPC channel 612 may also allow client agent 604 to supply credential and authentication information that enables connectivity and SSO to enterprise resources 608. The IPC channel 612 may also allow client agent 604 to supply file scan data and scanning application information that is used by an access manager or the like to enable/disable file access controls. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources. These client certificates may also be stored with scan data associated with the client device or user.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Illustrative Embodiment(s) of Distributed Document Security

Figure 7:
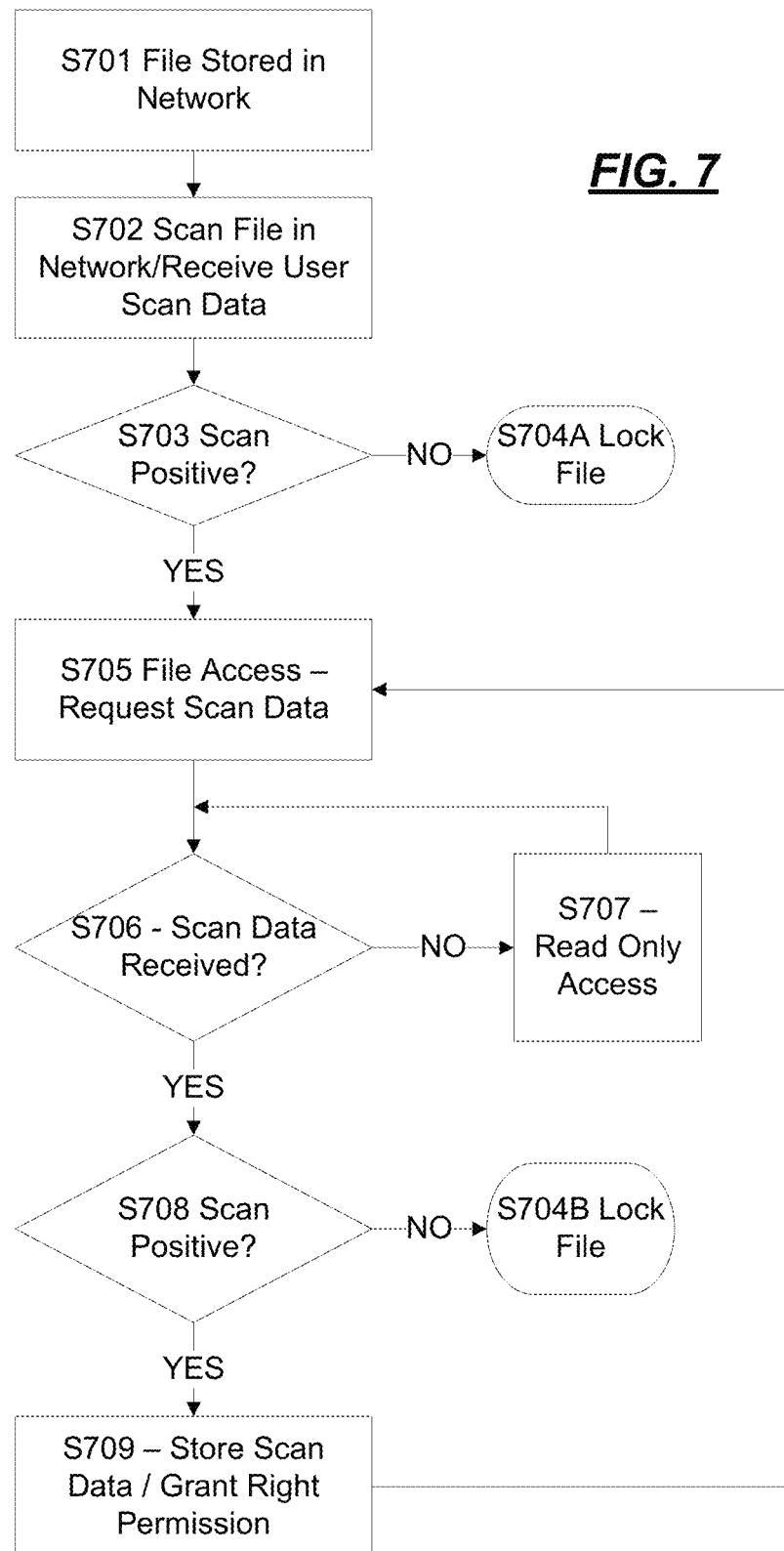
FIG. 7 depicts an illustrative flowchart for file processing by an access manager for the network storage system

FIG. 7 depicts an illustrative flowchart for file processing by an access manager for the network storage system. In S701, a file to be shared may be stored in the network or cloud storage system by a first user. An administrator or administrative application of the enterprise or cloud storage system, such as access manager 410A, may be configured to request scan data from one source or multiple sources based on the selection of a particular security setting set by the administrator. The security settings may include a cloud only option, a client cumulative option, a cloud and client option, and a cloud and client cumulative option. The features discussed below may be implemented as part of an access manager, an administrative application, or part of the network storage system.

In S702, scan data for the file to be shared may be generated by a network based scanner such as a scanning application initiated by the operating system 217 or an application 219 of a host computer 201, by the operating system 314 of a virtualization server 301, by the operating system 314 of a virtualization server 301, by a management server 410 or host servers 403a-403b in a cloud networking system, by enterprise services 508, and the like. The enterprise or cloud storage system may request or require scan data from only a network or cloud based scanner, from only a client based scanner, from each client that has requested access to the file, from the file creator and the network or cloud based scanner, or from each of the file creator, each client that has requested access to the file and the network or cloud based scanner. These options are described in greater detail below. This scan data may be gathered and stored in a table associated with the file. The table data may be stored as a blockchain, which may be updated to include all scan data generated over the history of the file.

In S703, the results of the scan data are determined. The scan data may indicate a binary result. That is, the scan data may indicate a valid or invalid/corrupt file. A file may be determined to be valid by the scanner when no known issue is associated with the file. That is, the scan of the file does not indicate a known virus, indicate a known threat signature, indicate that the file has been tampered with by unauthorized sources, or contain another indication of malware, a virus, or another system threat.

The scan data may also return a confidence value based an evaluation of the file. The confidence value may indicate the relative confidence that the file is valid based on the combined scan data. The network based scanner may determine a confidence value associated with the scan, and may compare the confidence value with the threshold set by the system or system administrators. For example, the access manager may allow a file with a high confidence value to be made accessible to the requesting user. A file with a low confidence value, below a threshold, may be locked. The threshold may be predetermined, or may be set by an administrator.

The threshold may allow the file to be considered valid, but risky. A file confidence that satisfies a high threshold may be useable by all user devises. A file confidence that is below a high threshold, but satisfies a low threshold may be presented to an administrator for further evaluation or presented to user devises with conditions. In such a situation, the file may be presented in a read-only or view-only mode, or the risk associated with the file may be presented to any user or host system attempting the access the file. As such, any user or host system attempting the access the file may be presented with a choice whether to proceed to access the file. Additionally, a warning message indicating the risk may be transmitted to the system administrator.

In S704A, if it is determined that the scan data does not indicate a positive result, the file may be locked. Based on system or application setting, a positive result may be an indication that a file is valid, or an indication that no issues were discovered after scanning the file. Based on system or application settings, a negative result may be an indication that a file is invalid, or an indication that potential issues were discovered after scanning the file. Both the positive and negative result may be based on criteria of the scanning system. The criteria may be predetermined signatures of known exploits or viruses. Each scanning application may have different criteria that determine a positive or negative result. Locking the file may comprise preventing any further access to the file or placing the file into a read only mode. Locking the file may trigger transmitting a message to system administration or to the accessing host system to indicate an issue determined from the scan data.

In S705, if a second user device, which did not upload the file, downloads the shared file, the access manager may grant read only access to the file. The download may trigger a security scan of the file using the second device's software application programming interface (API). That is, the file sharing software, such as SHAREFILE by Citrix Systems, Inc., may instigate a scan by analysis software when file download is complete.

The network storage system, which may include an access manager, may request scan data, based on the type of system implemented and available system tools. The network storage system may request one or both of client based scanning data or network based scan data for the file. The network storage system may also request data associated with scan data, which may indicate the type of scan, the version of the scan software, and any update information associated with the scan software. The scan may be automatic, or may be suggested in order to obtain file read/write access, depending on an administrator configured setting. After the scan is complete, a report of a result of the scan is transmitted to access manager in the cloud. If the scan result is positive, complete read/write permission for the file may be granted to the second user. If any scan reports a negative result, the file may be marked as invalid and further access to that file may be prevented. A negative result may trigger the access manager to prevent all users from accessing the file associated with the negative result. The results of all scan data can be stored in a ledger, as discussed in greater detail below. The ledger may be a table, a database, or a blockchain. The ledger may be associated with a file, or may be associated with access manager managing access to a plurality of shared files.

In S706, the network storage system or access manager may request scan data through an application or device interface, and may monitor the traffic from the application for scan data. The network storage system or access manager may determine if scan data is received. If scan data has not been received, the network storage system, in S707, may limit file access. For example, the network storage system may limit file access to read only access. Alternatively, the network storage system or access manager may provide read only access in response to the any request for file access, and may continuously check for scan data in response to a host system accessing that file. Upon receiving positive scan data, the network storage system may transition from read only file access to a less secure access level to allow the accessing user to make changes to the file.

In S708, the network storage system or access manager may determine if the scan data indicates that the file is valid or scan data indicates some kind of corruption/infection. If the scan data is not positive, the network storage system may lock the file in S704B. Locking the file may comprise preventing any further access to the file or placing the file into a read only mode for the user requesting access. Locking the file may trigger further messaging to system administration or the accessing host system indicating an issue determined from the scan data.

As this shared file may have undergone a previously successful scan by a different scanner associated with a different client or host device, the network storage system in S704B may re-scan the file with a network based scanner. If a re-scan with a network based scanner indicates that the file is valid, the user or an administrator may be notified of the negative scan. That user or administrator may begin or request file recovery, if necessary.

The network storage system may store multiple versions of the same file. For example, the storage system may maintain the original file stored, and at least one previous version of a shared file associated with a valid scan result. The network storage system may retrieve a stored previous version of the file and may determine if that previous version of the file is valid. If that stored previous version of the shared file is valid, the network storage system may provide that file as a recovered version of the file, along with an indication that the last changes to the file have not been recovered.

In S709, the network storage system has determined in S708 that the scan data, based on the scan of a shared file stored in the network storage system, indicates that the file is valid. Upon a positive scan result, the network storage system may grant the host or mobile device accessing the file full read/write access. The network storage system will also add the scan data to a ledger associated with the scanned file. The ledger may be associated with a same storage area as the shared file in the network storage system and may include all scan data provided by all previous scans of the file. The ledger may be stored in a database associated with the access manager, and may be provided as metadata associated with the file, or may be stored as part of a blockchain associated with the file. A blockchain ledger may add a new block including a hash of the previous block and new scan data.

In a cloud only system option, a host system may be a client of an enterprise network or cloud storage system. The host system may upload a file to the network storage system. The file may be scanned by a security analysis system of the network storage system in S702. In a cloud only option, the network storage system storage system may also request scan data from the access manager generated by the host system. After the network security analysis system has initially scanned the file, the network security analysis system may determine whether the file may be accessed or downloaded by other hosts or other users.

Upon any changes to the file, the file may be re-scanned again by the security analysis system of the network storage system. The file may be stored in a view only mode until a new scan by the security analysis system of the network storage system is complete. As scanning systems and applications may be upgraded or replaced over time, scan data of each scan may be stored to assist in any file recovery or security analysis. The scan data may indicate any updates to the applications or new scanning applications that are used to scan the file. The file may be stored in an isolated area of the network storage system while waiting to be scanned, and may be moved to a general storage area only after the file has been scanned by a security analysis system of the network storage system. In addition, the file may be scanned by multiple applications or tools employed by the security analysis system of the network storage system. Users may be prevented from accessing the file, or the file may be limited to a view only mode until all scanning tools of the security analysis system of the network storage system have run and have returned data indicating that the file has not been compromised.

In other situations, the enterprise administrator may enforce a policy to use security/corruption scanning software at each host across a network, and may prompt for a security scan of each network file accessed. The network policy may also require that an auto-update feature be turned on. By leveraging such a policy, the system may enforce effective read/write permissions on each shared file that is to be uploaded or downloaded. By such a policy, only files on which a host scanning tool has run a scan may be stored, and provided a result of a scanner result from the local system may store or write to a shared file on the networked system.

Figure 8:
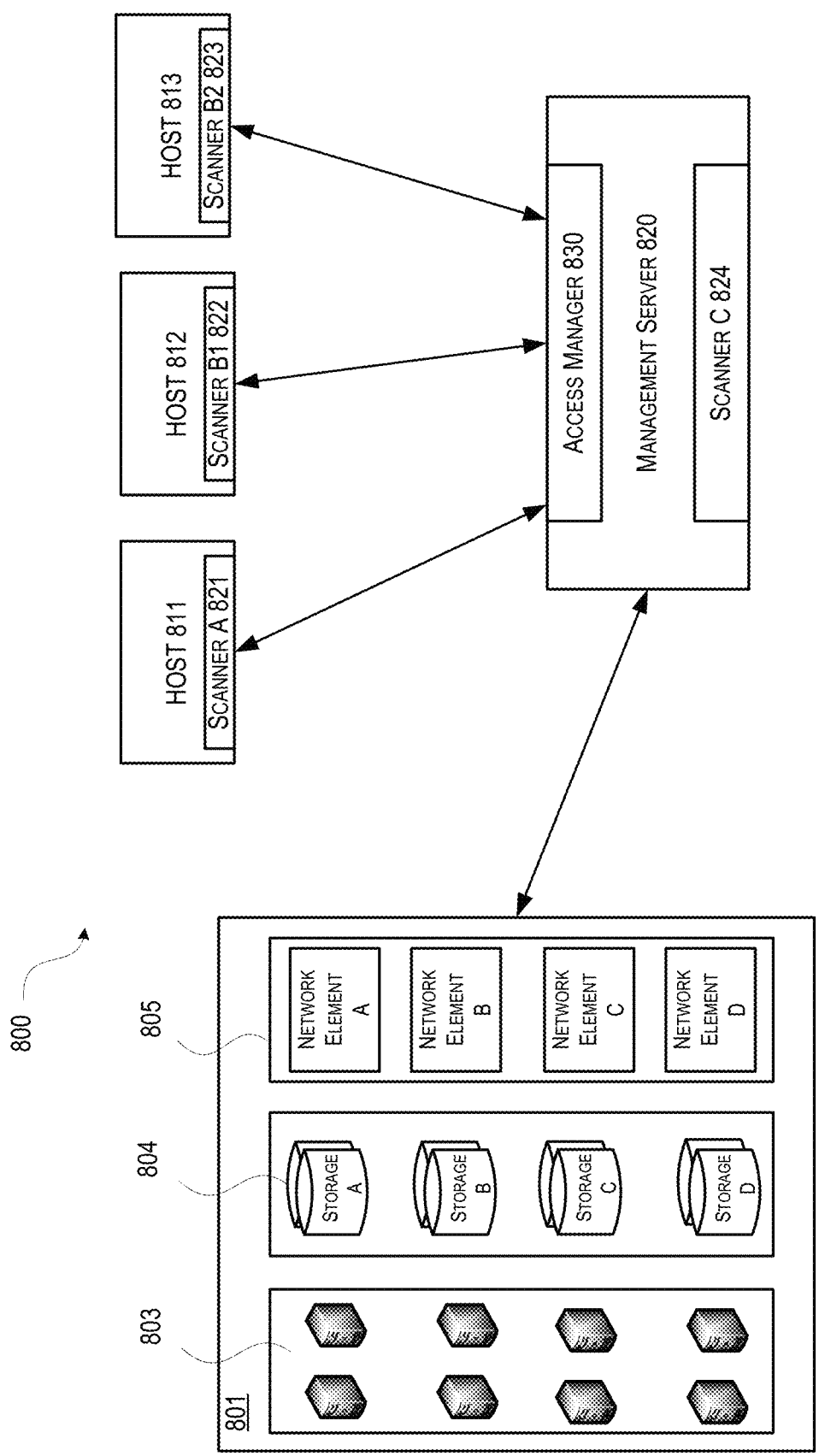
FIG. 8 depicts another illustrative network storage system with independent distributed scanners.

With reference to FIG. 8, some aspects described herein may be implemented in a network storage system (which may be cloud-based) environment. FIG. 8 illustrates an example of a network storage system (or cloud network storage system) 800. As seen in FIG. 8, host devices 811-813, which may be a combination of client computers or mobile devices, may communicate with a management server 820 to access the computing resources (e.g., host servers 803, storage resources 804, and network elements 805) of the network storage system 801. The network elements 805 may include private network connections to remotely located resources within private networks external to the enterprise system.

The enterprise system 800 may have an administrator enforced security policy. The enterprise system 800 may enforce a group policy that may require performing security scanning software on each of the host device 811-813. For example, each of the host machines 811-813 may be the provisioned with Windows Defender antivirus software, or MacAfee Total Protection antivirus and privacy software. These different software applications may be provisioned in different host devices 811-813 or network management devices as scanners 821-824. As each different application or version of an application provides a different variety of protections and are maintained and updated by different companies, the protection provided by each scanner 821-824 may be different.

A file-sharing tool may register with the security scanner using its API to request or retrieve security scan reports. The file-sharing tool, which may be part of Access Manager 410A or part of another network server 403 may register with a particular client application 219 on host 201, may be registered as part of a tools stack 324 for a control program 320 in a virtual machine 332, may be registered as part of the suit of enterprise services 508 for mobile device, and may be set as a device policy by a gateway server 606.

The access manager 830 may be part of a management server 820 or another element of the network zone 801, similar to zone 401 discusses above. The access manager 830 may generate the ledger for each file stored in the shared file system. The ledger may include a table for an individual file, or a series of tables for a number of shared files managed by the access manager. A ledger may be associated with each user, or may be associated with all shared files managed by the access manager.

The ledger may be associated with a particular user or may be associated with the particular storage location. The ledger may be a table or database associated with the file and stored in a location associated with the file location. The ledger may contain a plurality of values associated with each file. The ledger may contain a file reference number indicating a storage location. The ledger may also contain data associated with each scan of the file. For each scan, the ledger may contain scanner data indicating the scanner type, the scanner version number, and the scanner updates applied, and any weight associated with the scanner data.

The access manager 410A app/tool may mandate receipt of a security scan report before the user acquires read/write permission on the file that is to be uploaded or downloaded. The access manager may temporarily store the file in a network security sandbox until the file has been validated by scanning the file and receiving a positive result from the security software. A sandbox is a security device for running programs in an isolated manner to mitigate system failures or software vulnerabilities from spreading. By scanning the file within a network sandbox, the untested or untrusted file may not infect other areas of the system. A sandbox may typically include an independent or isolatable set of resources to use to scan the file. Network access to the file in the sandbox and the sandbox resources may be prevented, except by the access manager. The sandbox may be embodied in a virtual machine, such as virtual machine 332B.

If no host scanning software available, the access manager may provide read only access to a file, or may prevent all access to the file. The mandated security scan report before upload/download may be a simple binary value indicating whether the analysis returned a positive result. That is, the security report may be a single bit in the file space associated with the file indicating that the scan indicated either that the file is valid, or the file has been determined to contain a sufficient risk that the file will be marked as to be invalid for the purposes of any further access requests.

In a cloud only system, the scan may be a single scan by a scanner of the network access manager upon upload. The scan may be repeated each time a different user or device requests access to the shared file. In a client only system, the scan may be a single scan by the client before upload can be finished. Each different user or device requesting access to the shared file may be required to provide scan data before being granted write access to the file. In a client cumulative system, each client accessing the file may be required to submit scan data, and the return of a negative scan result by any individual client accessing the file may result in the file being locked to prevent any further access by any other user or device. In a cloud and client only system, each client accessing the file may be required to submit scan data and a network/cloud based scanner may be required to submit scan data, and the return of a negative scan result by any individual client accessing the file or a negative scan result from the cloud/network scanner may result in the file being locked to prevent any further access by any other user or device. In cloud and client cumulative approach, the features of the cloud only system and client cumulative system may be combined. In that regard, scanning services of each user or host device and a network scanner are requested. A cumulative report of the scans of each host and network scan may be associated with the shared file. In addition, based on the scan data of each host and network scan may be associated with the shared file, a confidence value may be associated with the shared file. The confidence value may be used to provide a cumulative scanning score based on all file scans. The confidence value may be weighted based on the types and versions of scanners employed throughout the network. The weights may be based on values assigned to the types and versions of scanners by the access manager program or a network administrator.

The network security analysis system may include a table management system for managing a plurality of files which may be received from a plurality of users. The table management system may maintain a ledger. The ledger may be a common ledger for all files stored by clients associated with a particular server or cloud network of servers, such as SHAREFILE servers.

As discussed above, an administrator or administrative control may mandate both cloud and client based security analysis. As machines or users operating different software in different network environments may scan each file, it is beneficial to consider the additional value of each scan. For example, a security scan based on a freeware software or new market entry with unknown or unproven level of security may be less preferred than a leading market software product that has been evaluated by multiple third parties and has a history of detecting and preventing a wide variety of security attacks. As each of those scans may be based on different levels or types of security analysis, each type of scan may be assigned a different weight.

The administrator or administrative control may configure weights to be used to generate a confidence value based on the type of scanner and updates applied to the scanner. A different weight may be assigned to each type of scanner, and different weight may be assigned depending on the particular updates applied to each type of scanner. A user or host device transmission of scan data may be mandated by the access manager 410A. The access manager 410A may request scanner credential data from any device uploading or requesting access to a shared file. The scanner credential data may be application data that indicate or identify the particular scanner application. The scanner credential data may also be indicate or identify the particular updates applied to the scanner application. The scanner credential data may be used by the access manager to authenticate the scanner. The request may comprise a request for the type of scanner (e.g. McAfee), the version of the scanner, and the last updates completed by the scanner. The access manager 410A may comprise a scanner weighting table comprising a plurality of scanner, scanner versions, and update listings, and the scanner weighting table may comprise a weight assigned to each type of scan.

For example, as shown in Table 1 below, each known scanner may have a weight assigned. Further, each scanner may have a plurality of known versions, and may be provided with various updates and patches that may improve the robustness of the analysis being performed by the scanner. As such, each scanner may have a different weight assigned to each scanner as implemented on a particular device. That is, the scanner may have a different weight assigned based on the version type, updates, and patches that have been installed. The weights may be predetermined and may be assigned by a system administrator or administrative device. A weight assigned to a most favored scanner may be the highest. In addition, older versions may be lowered automatically as new versions are released. For example, the weight associated with Scanner A, version 1.3 may be higher than a weight assigned to Scanner A, version 1.2.

TABLE 1

| Scanner | Version | Weight [1-10] 10 -> high |
|---------|---------|--------------------------|
| A | 1.2 | 6 |
| A | 1.3 | 7 |
| B | 2.3 | 8 |
| C | 1.2 | 6 |

The weights may be used to calculate values for a ledger comprising scan data from a plurality of scanners. The ledger may be a table or database associated with the file and stored in a location associated with the file location. The ledger may contain a plurality of values associated with each file. The ledger may contain a file reference number indicating the storage location. The ledger may also contain data associated with each scan of the file. For each scan, the ledger may contain scanner data indicating the scanner type, the scanner version number, and the scanner updates applied, and any weight associated with the scanner data. As shown in Table 2 below, the scan data in the ledger for each file may include result data for each scan by each device accessing the shared file. In an unweighted implementation, a single failed scan result, such as the failed result from User 4 in the table below, may result in the shared file being locked and no longer being accessible. However, in a weighted implementation, a single failed scan result may be considered against the positive scan result from other users. While the shared file may be locked to prevent User 4 from altering the shared file, the system may be configured to allow other users to continue to access the shared file.

For each scan that indicates that the file is secure, a plurality of values associated each shared files with the as follows:

TABLE 3

| File | Average of scanners that reported file as secure | Average of scanners that reported the file as insecure | Averages Ratio | Comments Ratio <2 = insecure Ratio 2 to 4 = report to admin and block Ratio >4 = secure file |
|---|---|---|---|---|
| File F1 | (5 + 6 + 7 + 8 + 3)/5 = 5.8 | (2 + 2 + 2 + 1)/4 = 1.75 | 5.8/1.75 = 3.3 | Report to Admin |
| File F2 | (5 + 6 + 8)/3 = 6.33 | (1 + 1)/2 = 1 | 6.33/1 = 6.33 | Secure file |
| File F3 | 1/1 = 1 | (5 + 1 + 6)/3 = 4 | ¼ = 0.25 | Insecure file |

TABLE 2

File 1

| Scanner | Version | Scan Result | Weight [1-10] 10 -> high |
|---|---|---|---|
| User 1 - Scanner A | 1.2 | Pass | 6 |
| User 2 - Scanner A | 1.3 | Pass | 7 |
| User 3 - Scanner B | 2.3 | Pass | 8 |
| User 4 - Scanner C | 1.2 | Fail | 2 |

The ledger may also be a block chain. A block chain for each file may comprise a hash value. The hash value may include data associated with the scanner reference number, a version number, and a weight number. The hash value can be a 16 byte number. Each block contains a pointer to the previous hash value. Each time a file is downloaded and scanned, the access manager creates a new entry for the block chain. Each new block in the block chain is associated with a new scan generated when the file is downloaded. A block chain ledger provides additional security against changes to previous scanning data. The block chain may be distributed to all file sharing clients of the network stored file.

In a client cumulative system, including weighted confidence values based on Table 1, each scan may be assigned a weight. The weight may be based on values assigned to known types of scanners, and based on different updates to the scanners. A scanner that has been updated more frequently may be assigned a higher weight. A scanner that performs more robust analysis may be assigned a higher weight. These weights may be assigned based on predefined values for known scanners.

When a user uploads the file and allows it to be shared, the file may be scanned by different clients and may also be scanned in the cloud system. Each of these scans may be logged in the ledger. The weights may be associated with the scan results of a particular shared file, as shown in Table 2. Based on the security scan report, a file security confidence value may be computed for a particular file. For each file, a log is stored in the ledger including the results of each scan. Having reports from different hosts, each employing different type or version of scanning software may increase user confidence that this is a safe file. A confidence value may be displayed to the user as a file property, so that the user may be aware of the level of confidence that the access manager has that the shared file is valid before accessing a shared file. An administrator of the access manager may also be able to review the confidence value with each file in order to diagnose the source of any file corruption in the system.

As shown in Table 3, an average ratio may be calculated for each file. For each scan associated with the file an average may be calculated for scanners that reported the file is secure and for scanners that reported the file is insecure. The average for scanners that reported the file as secure may be calculated by summing the weighted score for each scan and dividing by the total number of scans that reported the file as secure. The average for scanners that reported the file as insecure may be calculated by summing the weighted score for each scan that reported the file is insecure and dividing by the total number of scans that reported the file is insecure. And averages ratio may be calculated by dividing the average weighted score for scanners that reported the file as secure by the average weighted score for scanners that reported the file as insecure.

Based on this averages ratio, the access manager may take protective actions. In Table 3, when the averages ratio is less than two, the file is determined to be insecure and is locked. When the averages ratio is greater than four, the file is determined to be secure, and read/write access is granted. When the ratio is between two and four, the file status is in question and is reported for additional analysis. The file may be sent to an administrator for further analysis. Until this analysis is complete the file may be locked. Using the weighted averages ratio calculation, a shared file may remain accessible despite a limited level of negative scan data. In this way, possible false negatives may be recognized by system administrators and corrective actions may be taken. For example, if a single scanner is repeatedly reporting negative results for shared file, the administrator may be able to evaluate the validity of the analysis conducted by that single scanner. In this case, if at least one of the software reports an issue, the file may be locked and the information regarding the source of the negative report will be shared with the administrator, who will have permission to allow/disallow the file from being accessed further. As such, the administrator may be able to identify a faulty scanner, or may be able to identify a threat that is being overlooked by the majority of scanners in the system.

In view of the foregoing, a ledger of scanning for security and corruption threats may be used to provide a cost effective and robust security solution for shared files stored by file sharing software solutions.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
storing, in a network storage system, a shared file received from a first user device;
receiving, by the network storage system and from the first user device, scan data associated with the shared file, wherein the scan data indicates results of a security scan of the shared file;
generating, by the network storage system, a ledger associated with the shared file, wherein the ledger comprises the scan data associated with the shared file on the network storage system;
receiving, at the network storage system, scan data from one or more additional user devices;
determining, by the network storage system, that the shared file is a valid file to share with users of the network storage system based on the scan data from one or more of the first user device and the one or more additional user devices, wherein determining that the shared file is a valid file comprises determining that there are no pre-identified issues associated with the shared file;
updating, by the network storage system and in response to the receipt of scan data from the one or more additional user devices, the ledger of the shared file in the network storage system;
weighting, by the network storage system, the scan data based on a type of scanner;
determining, based on the weighted scan data, a confidence value of the shared file;
determining that the confidence value exceeds a confidence threshold; and
providing, by the network storage system, based on the determining that the shared file is a valid file to share with the users of the network storage system, and based on the determination that the confidence value exceeds the confidence threshold, permission to access the shared file to the one or more additional user devices.

2. The method of claim 1, further comprising:
sending, from the network storage system and to the one or more additional user devices, a request for a scanner credential from the one or more additional user devices;
receiving, at the network storage system, the scanner credential from the one or more additional user devices; and
authenticating, by the network storage system, an additional user device scanner based on the scanner credential received from the one or more additional user devices.

3. The method of claim 1, wherein the determining that the shared file is a valid file to share with users of the network storage system based on the scan data from one or more of the first user device and the one or more additional user devices comprises:
receiving, from one or more of the first user device and the one or more additional user devices, scan data;
analyzing the scan data for an indicator that the shared file includes one or more of signatures of known exploits, malware, or viruses; and
determining that shared file is valid based on the indicator of the scan data.

4. The method of claim 1, further comprising:
obtaining, by the network storage system, policy information associated with the shared file; and
preventing, based on the policy information associated with the shared file, write access to the shared file until policy conditions have been met.

5. The method of claim 1, wherein the generating the ledger associated with the shared file comprises generating a blockchain associated with the shared file.

6. The method of claim 5, wherein updating the ledger of the shared file comprises adding to the blockchain based on scan data of the one or more additional user devices and a hash related to scan data of at least one of the first user device or the network storage system.

7. The method of claim 1, wherein the network storage system comprises a cloud network storage system, and wherein the ledger is stored in the same cloud network storage system as the shared file.

8. The method of claim 1, further comprising:
scanning, by the network storage system, the shared file with a security application to generate the scan data; and
associating, by the network storage system, the scan data with the ledger of the shared file.

9. The method of claim 1, wherein the scan data comprises scanner type data indicating the type of scanner and scanner update data indicating any updates the scanner has applied.

10. An apparatus, comprising:
at least one processor; and
memory storing executable instructions configured to, when executed by the at least one processor, cause the apparatus to:
store a shared file in a network storage system;
request, from a first user device, scan data associated with the shared file, wherein the scan data indicates results of a security scan of the shared file;
generate a ledger associated with the shared file, wherein the ledger comprises the scan data associated with the shared file;
receive a request from a second user device to access the shared file stored on the network storage system;
in response to receiving the request to access the shared file, request scan data from the second user device;
update, based on a response to the request for scan data from the second user device, the ledger of the shared file in the network storage system;
weight the scan data based on a type of scanner;
determine, based on the weighted scan data, a confidence value of the shared file;
determine that the confidence value exceeds a confidence threshold; and
transmit, based on a determination that the confidence value exceeds the confidence threshold, write permission for the shared file to the second user device.

11. The apparatus of claim 10, wherein the apparatus is further configured to:
receive, from a third user device, a second request to access the shared file stored on the network storage system;
in response to receiving the second request to access the shared file, request scan data from the third user device; and
update, based on a response to the requesting scan data from the third user device, the ledger of the shared file in the network storage system.

12. The apparatus of claim 10, wherein the apparatus is further configured to: obtain policy information associated with the shared file; and
prevent, based on the policy information associated with the shared file, write access to the shared file until policy conditions have been met.

13. The apparatus of claim 10, wherein the apparatus is further configured to:
  scan the shared file with a security application of a cloud storage system to generate the scan data; and
  associate the scan data with the ledger of the shared file.

14. The apparatus of claim 10, wherein the confidence value indicates a likelihood that the shared file is corrupted.

15. The apparatus of claim 10, wherein the scan data comprises scanner type data indicating the type of scanner and scanner update data indicating any updates the scanner has applied.

16. One or more non-transitory computer-readable media storing instructions configured to, when executed, cause a computing device to:
  store a shared file in a network storage system;
  request, from a first user device, scan data associated with the shared file, wherein the scan data indicates results of a security scan of the shared file;
  generate a ledger associated with the shared file, wherein the ledger comprises the scan data associated with the shared file;
  receive a request from a second user device to access the shared file stored on the network storage system;
  in response to receiving the request to access the shared file, request scan data from the second user device;
  update, based on a response to the request for scan data from the second user device, the ledger of the shared file in the network storage system;
  weight the scan data based on a type of scanner;
  determine, based on the weighted scan data, a confidence value of the shared file;
  determine that the confidence value exceeds a confidence threshold; and
  transmit, based on the determination that the confidence value exceeds the confidence threshold, write permission for the shared file to the second user device.

17. The one or more non-transitory computer-readable media of claim 16, wherein the instructions are configured to, when executed, cause the computing device to:
  receive, at the network storage system and from a third user device, a second request to access the shared file stored on the network storage system;
  in response to receiving the second request to access the shared file, request scan data from the third user device; and
  update, based on a response to the requesting scan data from the third user device, the ledger of the shared file in the network storage system.

18. The one or more non-transitory computer-readable media of claim 16, wherein the instructions are configured to, when executed, cause the computing device to:
  obtain policy information associated with the shared file; and
  prevent, based on the policy information associated with the shared file, write access to the shared file until policy conditions have been met.

19. The one or more non-transitory computer-readable media of claim 16, wherein the scan data comprises scanner type data indicating the type of scanner and scanner update data indicating any updates the scanner has applied.

\* \* \* \* \*